D. W. McNEIL.
MACHINE FOR MOLDING CERAMICS.
APPLICATION FILED MAR. 19, 1917.
1,302,191.
Patented Apr. 29, 1919.
4 SHEETS—SHEET 1.
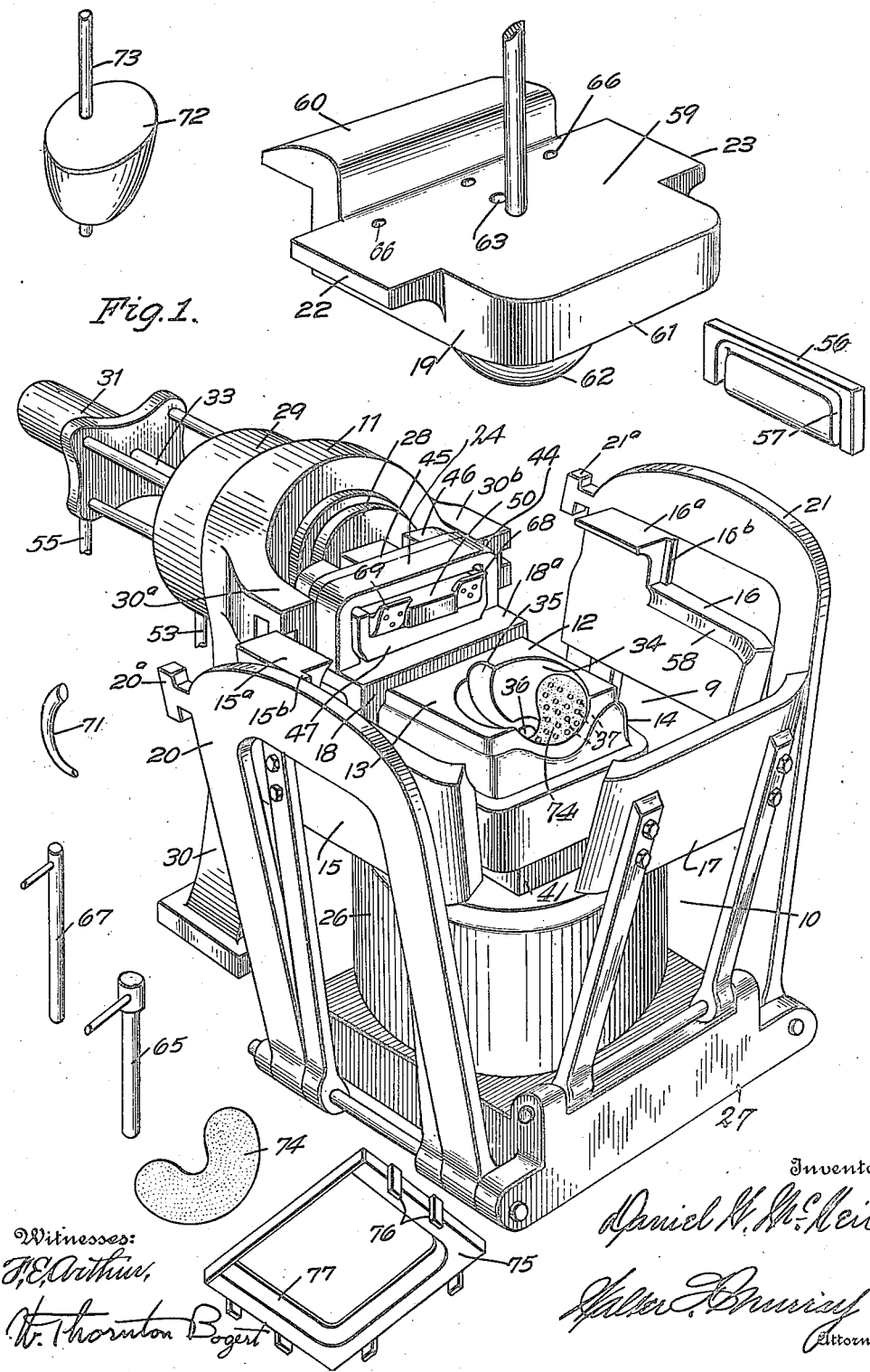

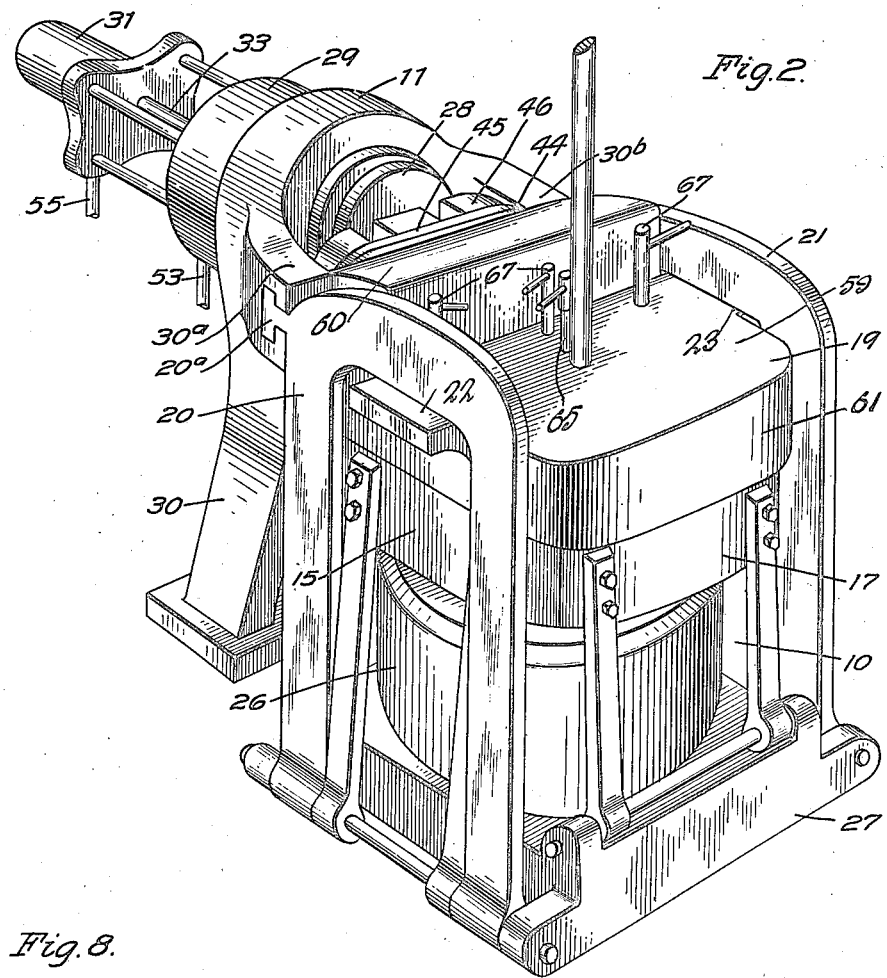
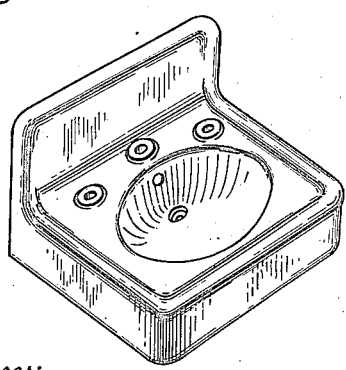
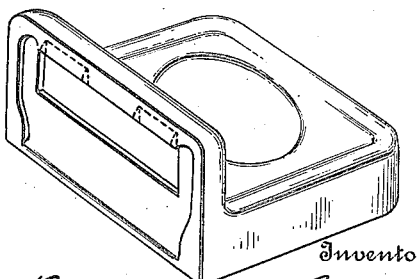

D. W. McNEIL.
MACHINE FOR MOLDING CERAMICS.
APPLICATION FILED MAR. 19, 1917.
1,302,191.
Patented Apr. 29, 1919.
4 SHEETS—SHEET 3.
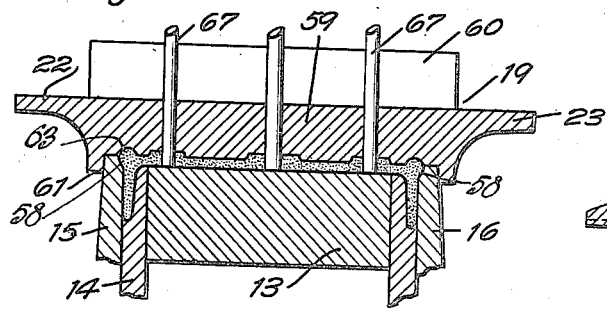
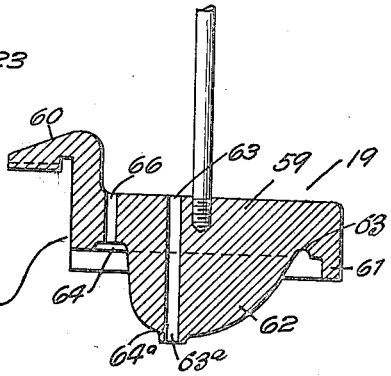
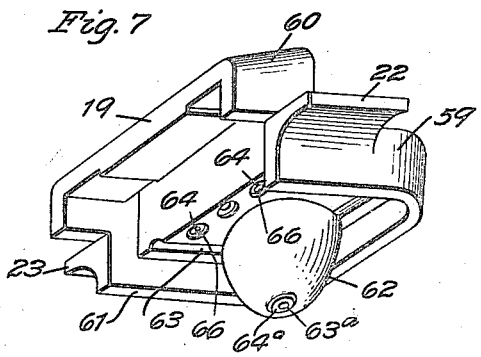
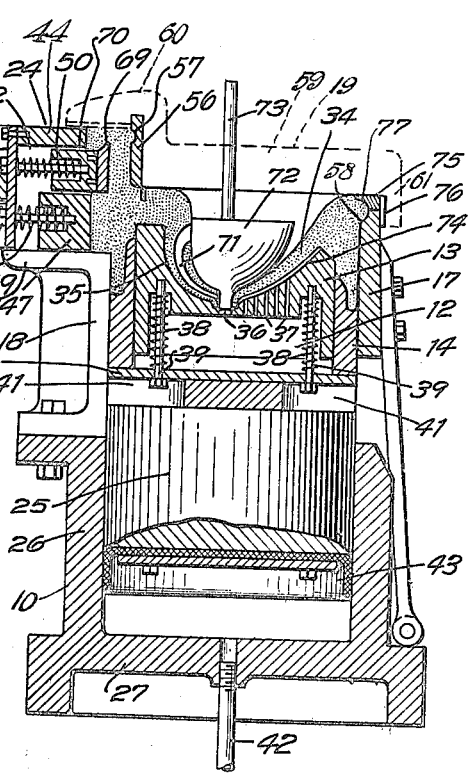
Witnesses:
H. E. Arthur,
W. Thornton Bogert
Inventor
Daniel W. McNeil
By Walter F. Murray
Attorney D. W. McNEIL.
MACHINE FOR MOLDING CERAMICS.
APPLICATION FILED MAR. 19, 1917.
1,302,191.
Patented Apr. 29, 1919.
4 SHEETS—SHEET 4.
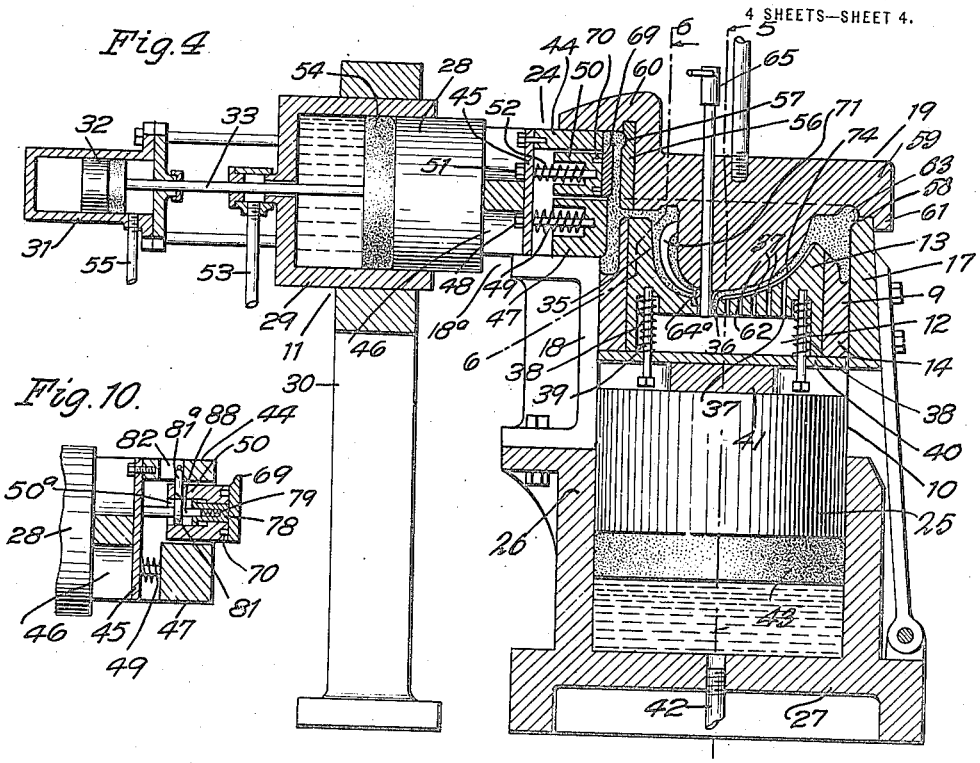
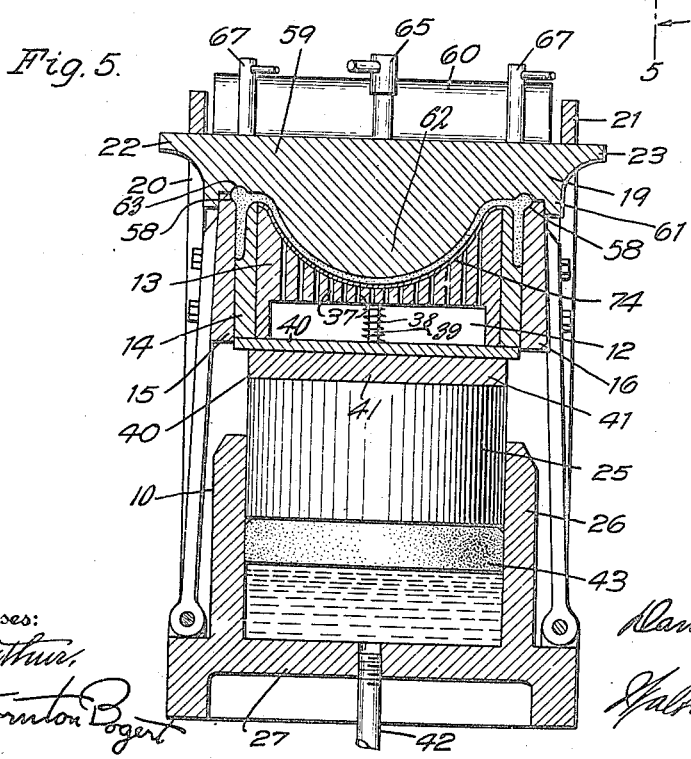

UNITED STATES PATENT OFFICE.

DANIEL W. McNEIL, OF CINCINNATI, OHIO, ASSIGNOR TO THE JOHN DOUGLAS COMPANY, OF CINCINNATI, OHIO, A CORPORATION OF OHIO.

MACHINE FOR MOLDING CERAMICS.

1,302,191.  Specification of Letters Patent.  Patented Apr. 29, 1919.

Application filed March 19, 1917. Serial No. 155,714.

*To all whom it may concern:*

Be it known that I, DANIEL McNEIL, a citizen of the United States of America, and resident of Cincinnati, in the county of Hamilton and State of Ohio, have invented a new and useful Improvement in Machines for Molding Ceramics, of which the following is a specification.

This invention relates to a machine for molding ceramic lavatories.

An object of my invention is to produce a machine adapted to mold lavatories having splash boards integrally formed therewith.

A further object is to produce a machine for molding lavatories having interior curved or tortuous passages or recesses.

These and other objects are attained in the machine described in the following specification and illustrated in the accompanying drawings in which;

Figure 1 is a composite perspective view of the machine and the elements employed therewith in the operation of molding lavatories.

Fig. 2 is a perspective view of the machine illustrated in Fig. 1, but showing the machine closed and in its molding position.

Fig. 3 is a composite vertical sectional view of the machine embodying my invention, showing the walls of the mold closed and filled ready for the removal of certain parts preparatory to the operation of molding a lavatory, the cover being located above the machine and ready to be placed in position thereon.

Fig. 4 is a vertical sectional view similar to that of Fig. 3, but showing the mold closed and the parts moved to their molding positions.

Fig. 5 is a transverse vertical sectional view taken on the line 5—5 of Fig. 4.

Fig. 6 is a fragmental sectional view taken on the line 6—6 of Fig. 4.

Fig. 7 is a perspective view of the under side of the mold cover.

Fig. 8 is a perspective view of the lavatory molded by my improved machine.

Fig. 9 is a rear perspective view of the lavatory illustrated in Fig. 8.

Fig. 10 is a sectional view of a detail of the machine embodying my invention.

The machine embodying my invention is designed to mold lavatories of the type having an integrally formed back or splash board, a rolled rim, an integrally formed apron, and a hidden overflow passage. In the molding of lavatories of this description I employ clay mixed with such a percentage of water that the particles thereof are in a non-adhesive or loose state and can only be brought to the plastic condition by being subjected to great pressure in the mold. Clay of this constituency is of such a nature that it resembles dust in that it will not adhere to the fingers and falls loosely when handled.

The machine embodying my invention consists of a mold 9 and suitable mechanisms 10 and 11 for operating the mold. The mold consists of a bottom 12 having a central portion 13 and a rim 14, walls 15, 16, 17 and 18 being provided to inclose the bottom. These walls when moved to their closed positions as disclosed in Figs. 2 to 5 inclusive, are adapted to receive a cover or top plate 19 which closes the mold. In order to retain the cover in position and to retain the walls of the mold against displacement from their closed positions, I have provided lock bars 20 and 21 located on opposite sides of the machine and adapted to engage lugs 22 and 23 extending from opposite sides of the cover, to secure the cover in position. Above the back wall 18 of the mold is located a movable wall section 24 carried by the operating mechanism 11 in the same manner that the bottom 12 is carried by the operating mechanism 10. Operating mechanism 10 consists of a plunger 25 located within a cylinder 26 extending from a base 27 forming the chief support of the machine and upon which the walls 15, 16, 17 and 18 are mounted pivotally, as well as the lock bars 20 and 21. Operating mechanism 11 consists of a plunger 28 mounted in a cylinder 29 which is supported by a standard 30 located back of the base 27. Cylinder 29 is employed to move plunger 28 forward to its operating position. In order to return the plunger 28 to its inoperative position I have provided a smaller cylinder 31 in which a plunger 32 is mounted reciprocally, plunger 32 being connected by means of a piston rod 33 with plunger 28. In order to hold the frame elements of the machine together at the time the interior of the mold is being subjected to pressure from cylinder 29, I have provided key lugs 20ª and 21ª on lock bars 20 and 21, which engage correspondingly shaped key slots in lugs 30ª and 30ᵇ formed on standard 30.

Portion 13 of the bottom of the mold is provided with a hollow 34 adapted to form the bowl of the lavatory. This hollow is provided with a channel 35 in which the external walls of the overflow passage of the bowl are adapted to be molded. This passage extends from the top to the center of the hollow and communicates with an orifice 36 formed in the bottom thereof for the drain of the bowl. Surrounding the orifice 36 are a series of small openings 37 which communicate at their lower ends with the atmosphere. The function of these small openings is to permit the escape of air from the clay during the molding operation. Bowl portion 13 is supported upon springs 38, the amount of expansion of which is controlled by bolts 39 passing into the portion 13 and having their heads engaging a plate 40 mounted on the block 41 located on top of the plunger 25 of the operating mechanism 10. This plunger is adapted to be operated in the cylinder 26 by means of water admitted thereto through a pipe 42 located in the bottom of the cylinder, a gasket 43 being provided for preventing leakage of the water between the plunger and the cylinder. It will thus be seen that the central portion 13 of the bottom of the mold is yieldingly supported upon the springs 38 and that it has a movement equal to the movement permitted by the bolts 39 between the plate 40 and the top of the plunger 25. Located outside the central portion 13 of the bottom 12 is a portion 14 adapted to form a rim surrounding the central portion 13 and within which central portion 13 is adapted to reciprocate. This rim is bolted to the plate 40 so that movement of the plunger 25 will operate directly upon the rim. Back wall 18 engages the lower portion of rim 14 at the back, walls 15 and 16 engage the lower portion of the rim at the sides, and front wall 17 engages the lower portion of the rim at the front. The inner surfaces of walls 15, 16, 17 and 18 are polished as are also all surfaces of portion 13 and rim 14 of the bottom of the mold, as well as the clay contacting surfaces of the cover 19 and wall section 24.

Wall 18 is in the form of an angle iron, a portion 18ª extending to the rear thereof and supporting section 24 of the rear wall of the mold. This section 24 consists of a rim 44 which is bolted to plate 45 secured to a block 46, which is in turn operated upon by the plunger 28. Rim 24 is substantially U-shaped, as shown in Fig. 1, it being inverted with its ends resting upon and in sliding engagement with rearward extension 18ª of wall 18. Within rim 44 is a portion 47 which is also U-shaped, but which has its branches extending upwardly, the bottom resting in sliding engagement with extension 18ª of wall 18. This portion 47 is mounted upon bolts 48 which are secured thereto and which extend through plate 45, springs 49 being located on the bolts for holding the portion away from the plate. Within the branches of portion 47 is located another portion 50, this portion being provided with bolts 51 which pass through plate 45 and upon which are mounted springs 52 in the same manner that springs 49 are mounted on bolts 48. The action of springs 49 is to hold portion 47 beyond portion 24 and the action of springs 52 is to hold portion 50 beyond portion 47 so that in its movement during the molding operation, the portions 50, 47 and 44 will be brought successively into compressing engagement with the clay located in the mold. The function performed by having portion 50 advanced beyond portion 44 is that sufficient clay may be placed between detachable plates 69 and 68 to become compressed when the lavatory is molded and thereby form the flanges of the recesses formed by the detachable plates.

Forward movement of plunger 28 which controls wall section 24, is controlled by the admission of water through pipe 53 and through the back of cylinder 29, a gasket 54 being provided on plunger 24 to prevent the leakage of water between it and cylinder 29. After having been moved to its operative position, plunger 28 is withdrawn by means of plunger 32 located in cylinder 31, rod 33, connecting plunger 32 with piston 28, a pipe 55 being provided through which the admission and discharge of water to and from cylinder 31 is controlled.

Walls 15 and 16 are duplicates of one another, upward extensions 15ª and 16ª being provided for partially embracing rim 44 of back wall section 24, the inner surface of each extension 15ª and 16ª being curved to engage the surface of rim 44. This permits of the rounded upper corners of the back or splash board section of the lavatory being formed. Against the front edges of extensions 15ª and 16ª a plate 56 is adapted to be located, flanges 15ᵇ and 16ᵇ being provided for properly locating plate 56 when walls 15 and 16 are brought to their closed positions. The back surface of plate 56 is polished and is provided with a groove 57 conforming to the curvature of the rolled rim around the back of the lavatory as disclosed in Fig. 8. The lower ends of the groove 57 are rounded off as well as that portion of the surface surrounded by the groove, so that when the lavatory is molded, the division between the basin portion and the back portion will not be so pronounced. As a continuation of the rolled rim formed by the groove 57 of the plate 56, walls 15, 16 and 17 have been provided with grooves 58 which form the lower portion of the rim located at the sides and front of the lavatory as disclosed in Fig. 8.

The top 19 which coöperates with the walls when they are moved to close the mold, consists of a main portion 59 adapted to cover that portion of the mold inclosed by the wall 17 and those portions of walls 15 and 16 which are located on opposite sides of the bottom 12. At the back of main portion 59 an upward extension 60 is provided. This extension is located over the rim 44 of wall section 24 and is adapted to close the top of the mold by engaging extensions 15ª and 16ª of the sides 15 and 16 as well as to form a support for plate 56 located between the flanges 15ᵇ and 16ᵇ. Main portion 59 of the top 19 is provided with a rim 61 which surrounds the sides 15, 16 and 17 and which is adapted to hold them in their closed positions and of sufficient strength to prevent their displacement therefrom when subjected to the pressure to which the mold is subjected. On the under side of main portion 59 is a projection 62 corresponding to the shape and size of the interior of the basin of the lavatory to be molded. This projection, when the top is lowered, occupies a position within the hollow 34 of portion 13 of the bottom 12 of the mold, with sufficient space between it and portion 13 to permit of ample clay to occupy the space between them in order to form the bottom and sides of the basin when the mold is brought to its compressing position. Surrounding this projection 62 is a groove 63 which coöperates with the grooves 58 and 57 of the walls 15, 16 and 17 and plate 56 respectively, in forming the rolled rim of the lavatory. In addition to this the under surface of the top 19 is provided with recesses 64 adapted to form the lugs which surround the water faucets and drain plug operating handle of the lavatory.

Since the lavatory of the type disclosed in Fig. 8, is provided with a series of recesses and hidden passages for the purpose of providing means for supporting the lavatory on the wall of the building to which it is to be attached as well as for an overflow passage and outlet, I have provided means for molding these passages simultaneously with the molding of the lavatory proper. In molding the outlet passage of the basin of the lavatory I have provided an aperture 63ª extending through the main portion of the top 19 and terminating in a lug 64ª formed on the bottom of the projection 62. In this passage I mount a pin 65, the pin extending therethrough and into the orifice 36 of the hollow 34 of the central portion 13 of the bottom 12. This keeps the clay from occupying this space and therefore provides the lavatory with an outlet passage. At each side of the opening 63 I locate openings 66 adapted to coöperate with pins 67, which are provided for these openings, for forming the faucet receiving apertures of the lavatory. Similar means is provided for the aperture of the stop plug operating handle.

In order to form the recesses which receive the wall hooks upon which the lavatory is mounted in securing it in position on the wall of the building, I have provided two plates 68 and 69 which are mounted on portion 50 of the wall section 24. These plates are removable from portion 50 by reason of the detachable mounting afforded them by pins 70 located on the back of the plates, so that when the plates are embedded in the clay upon bringing the plunger 28 to its molding position, they will be left therein upon withdrawal of the plunger from its molding position, so that when the molded lavatory is removed from the machine these plates may be removed therefrom and replaced in the position disclosed in Fig. 1.

To facilitate the removal of the plates, portion 50 is provided with a passage 50ª back of each plate 68 and 69, in each of which is reciprocally mounted a thimble 78 adapted to engage the rear surface of each of the plates, see Fig. 10. Within each thimble a coil spring 79 is mounted, the spring at its inner end engaging a rod 80 which is of sufficient length to abut plate 45. Formed upon the rod is an annular flange 81 above which is formed a passage in portion 50, the passage being in alinement with the flange. In this passage a pin 81 is reciprocally mounted, the upper end of the pin engaging a slot 82 formed in portion 44. In their inoperative positions the parts are as shown in Fig. 10, the pin 81ª engaging the surface of the flange 81 of rod 80.

When plunger 28 is moved to compress the clay in the machine, portion 50 is moved backward to the position in which pin 81ª drops back of flange 81, the action of rod 80 against plate 45, being to compress spring 79. This causes each thimble 78 to tend to displace each removable plate mounted in front of it, the clay preventing displacement of plates.

However, when plunger 28 is retracted, springs 79 force thimbles 78 outward and displace plates 68 and 69, rods 80 being held away from plate 45 upon withdrawal of the plunger, because of the engagement of pin 81ª with the rear surface of flange 81. This overcomes any danger of the removable plates failing to leave portion 50 when plunger 28 is withdrawn. After the plunger has been withdrawn, rod 80 and thimble 79 are restored to their normal positions by withdrawing pin 81ª to permit the rod to seat itself against plate 45 and to permit thimbles 78 to be pushed back to the position disclosed in Fig. 10.

In order to mold the overflow passage I have provided a horn shaped implement 71 which is adapted to occupy the recess 35 of the bowl 34 and to rest upon the clay located in this recess and in engagement with the projection 62 of the top 19 when the mold is closed, the clay being worked around the horn so that it will be embedded in the bowl after molding operation thereof is completed. The horn then may be removed by slipping it from the passage it has formed.

Each of the lock bars 20 and 21 as well as the walls 15, 16 and 17 are pivotally mounted on the base of the machine as disclosed in Figs. 1 and 2.

In operation;

The polished interior surfaces of the mold are first coated with a mixture of lard oil and coal oil, about 50% of each being employed. This mixture is designed to prevent the clay from adhering to the surfaces when the walls are moved from one another after the molding operation has been completed. After the polished surfaces have been coated, the walls 15, 16 and 17 are moved inwardly until they engage the lower portion of the rim 14 of the bottom of the mold. This brings extensions 15$^a$ and 16$^a$ into engagement with the ends of rim 44 of wall section 24. The walls are retained in this position either by reason of their being normally inclined toward the center when moved to this position or they may be supported in this position by struts placed against them and having their lower ends bearing upon the floor. With the walls held in this position and the bottom plunger 25 moved to its lowest position as well as the plunger 28 moved to the limit of its backward movement, the space between the walls is filled with the dust-like mixture of pulverized clay and water. This is worked carefully into the space between the walls and the upper portion of the rim 14 by the hands, and the top above the rim is filled with clay. However, previous to placing any clay in the hollow 34 a piece of felt 74 is placed therein to cover the openings of the vent passages 37, and a form 72 is placed in the hollow and the clay is filled around it. The purpose of the felt is to prevent clogging of the vent passages by the clay. This operation packs the clay into an embryonic form of the bowl or basin before it is compressed. However, after partially filling the space surrounding the form 72, the horn 71 is placed in the channel 35 of the hollow 34 and the clay is worked around it and between it and the form, as disclosed in Fig. 3. The form is now rocked in all directions against the clay surrounding it to slightly compress it in order to cause it to retain the general formation given it by the hollow 34. Form 72 is provided with a handle 73 which is utilized for this purpose, the lower end of the handle being located in the orifice 36 during this operation. After having been filled to the top of the walls a plate 75 is placed thereon, this plate being provided with lugs 76 which space it properly on the walls. The under surface of the plate is provided with a curved recess 77 which extends around it and which coöperates with the groove 58 of the walls 15, 16 and 17. The clay is now worked into this groove or recess, the plate being retained in this position until the groove is filled. When completely filled the lower portion of the mold presents the appearance disclosed in Fig. 3. Plate 56 is now placed in position between the flanges 15$^b$ and 16$^b$ with its groove 57 facing wall section 24. The plate is held in position while the space between it and the wall section is filled with the clay and is packed into position by the hands. When the mold is completely filled, temporary form plate 75 is removed but plate 56 is allowed to remain, form 72 also being carefully removed. The mold now being filled, pins 65 and 67 are placed in their respective openings 63 and 66 and cover 19 is lowered into position to engage the walls, projection 62 extending into hollow 34 and rim 61 engaging the outer faces of walls 15, 16 and 17, with upward extension 60 located on top of rim 44 of wall section 24. Lugs 22 and 23 of cover 19 are now engaged by the lock bars 20 and 21, these lock bars being brought over the lugs to retain the cover in position and simultaneously bringing their T-shaped lugs 20$^a$ and 21$^a$ into engagement with the correspondingly shaped recesses of the lugs 30$^a$ and 30$^b$ of the standard 30. In this position the bars prevent displacement of the cover when the interior of the mold is subjected to pressure from the plunger 25 and lugs 20$^a$ and 21$^a$ prevent movement of standard 30 from the mold when plunger 28 is subjected to pressure.

Upon being subjected to pressure the water in the lower cylinder forces piston 25 upwardly carrying with it rim 14 and central portion 15 of the bottom of the mold. Simultaneously with this movement, plunger 28 carries with it wall section 24. The result is that the clay between the cover and the bottom and between the cover and wall section 24 is compressed, walls 15, 16, 17 and 18 determining the size of the lavatory when completed. When the vertically moving plunger 25 moves upwardly, central portion 13 of the bottom 12 presses the clay into engagement with projection 62 of cover 19. This compression extends over a period sufficient to expel substantially all of the air contained in the loosely packed clay and results in the springs 38 yielding as soon as this compression overcomes the tension of the springs. Thus the central portion 13 is permitted to yield while the rim 14 continues upward in its pressing operation. Simultaneously with this operation the horizontally moving plunger carries wall section 24 toward plate 56. Consequently, centrally located portion 50 first engages the clay between it and the plate 76 with such a degree of tension as to cause springs 52 to yield. After this degree of compression has been reached, section 47 is caused to engage the clay with sufficient pressure to cause its springs 49 to yield. The pressure is then continued until rim 44 has brought all of the clay to the same degree of compression. Substantially all of the air contained in the loosely packed clay has now been expelled therefrom. In practice I find that approximately 150 pounds per square inch is required for this purpose. After the plungers have ceased their compression movements under this pressure, the pressure is increased to 1000 pounds per square inch. This great pressure now brings the clay to a plastic condition, the air being entirely expelled and the water so closely incorporated with the clay as to render it plastic and capable of easily filling the space between the bottom and top and between the walls of the mold. This great pressure is maintained until the plastic condition of the clay has caused it to become thoroughly molded and forced into all parts of the mold. The pressure is now released and plunger 25 permitted to return to its normal position in the bottom of the cylinder 26, this action withdrawing rim 14 and central portion 13 from the molded lavatory. Upon releasing the pressure from cylinder 29, pressure is admitted to cylinder 31. This causes plunger 32 to withdraw plunger 28 and consequently wall section 24. However, in withdrawing wall section 24, plates 68, 69 having been molded into the lavatory, are left therein, the wall section returning to its normal position without them. Lock bars 20 and 21 are now thrown to their releasing positions and cover 19 is raised from the molded lavatory. The walls are now moved to their opened positions and the lavatory is left supported on the central section 13 of the bottom of the mold. From this it is removed and the felt 74 which has adhered to the bottom thereof, is removed as well as the horn which has been molded into the lavatory to form the overflow passage. In removing the horn it may be necessary for the operator to trim around the horn in order that it may be removed with facility to avoid breaking the walls of the lavatory. Any roughness created by the joints between the mold walls or the top or bottom of the mold, is now removed and the lavatory otherwise prepared by spraying with glazing material, for the burning process.

Having thus described my invention, what I claim is:

1. A molding machine comprising a movable bottom having telescoping sections, a top coöperating with the bottom, said bottom having a hollow formed therein and said top having a projection adapted to enter the hollow, front, side and back walls surrounding the bottom, the front and side walls being adapted to engage the top, the back wall being spaced from the top, and a movable wall located in the space between the top and the back wall, said movable wall having a series of telescoping portions, and means adapted to move said movable bottom and wall to bring said telescoping portions into engagement with material located in the space between said walls, bottom and top.

2. A molding machine comprising a movable bottom having telescoping portions, a top coöperating with the bottom, walls surrounding the bottom, certain of said walls engaging the top and the remaining of said walls being spaced from the top, and a movable wall located in the space between the top and the remaining wall, said movable wall having a series of telescoping portions and a portion of one of said telescoping portions removably mounted and adapted to become embedded in the material located in the space between said walls, bottom and top when said movable wall and movable bottom are brought into compressing engagement with said material, and means for reciprocating the wall and bottom to and from their operative positions, whereby said removable portions of said wall will be detached from said wall upon return of said wall to its inoperative position.

3. In a mold for lavatories the combination of a movable bottom wall, side walls surrounding the movable bottom wall, a form resembling in shape the interior formation of the lavatory bowl, adapted to coöperate with the movable bottom wall to assemble the material while the mold is being filled, and a top mold wall adapted to be brought into the position of the form upon the removal thereof.

4. In a molding machine for lavatories, the combination of a series of side walls, a bottom wall, a plate resembling in shape the top of the article to be molded, adapted to occupy a position on the side walls while the mold is being filled, and a top mold wall adapted to be brought into position on the side walls after removal of the plate.

5. In a molding machine for lavatories the combination of a movable bottom wall a series of side walls surrounding the bottom wall, a form resembling in shape the interior formation of the lavatory bowl, adapted to be positioned adjacent to the interior of the movable bottom wall while the mold is being filled, a plate resembling in shape the top of the lavatory, adapted to occupy a position on said walls while the mold is being filled, and a top mold wall adapted to be brought into position opposite the bottom mold wall and on the side walls, upon removal of the form and the plate from said bottom and side walls.

In testimony whereof, I have hereunto subscribed my name this 15th day of March, 1916.

DANIEL W. McNEIL.

Witnesses:
  WALTER F. MURRAY,
  W. THORNTON BOGERT.